United States Patent [19]

Patrick et al.

[11] Patent Number: 4,779,560

[45] Date of Patent: Oct. 25, 1988

[54] RAPIDLY OPENING PEAK-CLIPPING VALVE FOR A HYDROPNEUMATIC SUSPENSION FOR A HEAVY VEHICLE

[75] Inventors: Marquant Patrick, Chatillon; Philippe Joseph, Carpentras; Jean-Michel Perrochat, Montrouge, all of France

[73] Assignee: S.A.M.M.-Scoiete D'Applications Des. Machines Motrices, Bievres, France

[21] Appl. No.: 43,715

[22] Filed: Apr. 29, 1987

[30] Foreign Application Priority Data

Apr. 29, 1986 [FR] France .................. 86 06191

[51] Int. Cl.$^4$ .................. F16F 9/34; F16F 9/28; F16K 17/26; B60G 11/26
[52] U.S. Cl. .................. 188/322.14; 188/303; 137/493.6; 280/714
[58] Field of Search .................. 137/493.3, 493.6; 188/21, 303, 304, 322.13, 322.14, 322.15; 280/714, 705

[56] References Cited

U.S. PATENT DOCUMENTS

| | | | |
|---|---|---|---|
| 1,801,587 | 4/1931 | Chryst | 188/304 X |
| 2,730,124 | 1/1956 | Buchanan | 137/493.6 |
| 3,127,907 | 9/1962 | Novak | 137/493.6 |
| 3,153,423 | 10/1964 | Biello . | |
| 4,156,536 | 5/1979 | Brandstadter . | |
| 4,217,927 | 8/1980 | Morita | 137/493.3 |
| 4,561,559 | 12/1985 | Rutan . | |
| 4,582,295 | 4/1986 | Kugler et al. | 137/493.6 X |
| 4,629,169 | 12/1986 | Arnaud et al. | 267/64.19 |
| 4,700,970 | 10/1987 | Joseph | 267/256 X |

FOREIGN PATENT DOCUMENTS 2141619 2/1972 Fed. Rep. of Germany ... 137/493.6
2583125 12/1986 France .

Primary Examiner—Andres Kashnikow
Assistant Examiner—Richard Potosnak
Attorney, Agent, or Firm—Sughrue, Mion, Zinn, Macpeak & Seas

[57] ABSTRACT

The valve comprises a hollow body (36, 37, 40) provided with a first inlet or outlet opening (38) and a second outlet or inlet opening (41) for a hydraulic fluid, and the following elements:

(a) a hollow slide (58) slidably mounted inside a hollow sleeve (56) slidably mounted in the body and coaxial with the slide (58);
(b) an elastic element (61) bearing against the body (40) and biasing the slide into abutment against an annular end of the sleeve and the sleeve (56) into abutment against an annular seat (58) of the body;
(c) and the annular bearing section (59) of the slide (58) on the sleeve (56) is less than the annular bearing section (57) of the sleeve on its seat (58), the sleeve being moreover provided with apertures (66) communicating with the first opening (38).

This valve avoids deterioration of the suspension of a heavy vehicle travelling at high speed over uneven ground.

14 Claims, 4 Drawing Sheets

RAPIDLY OPENING PEAK-CLIPPING VALVE FOR A HYDROPNEUMATIC SUSPENSION FOR A HEAVY VEHICLE

The present invention relates to a rapidly opening double acting peak-clipping valve for a hydropneumatic suspension element of a heavy vehicle.

Hydropneumatic suspension elements, in particular oleopneumatic suspension elements for a heavy vehicle, comprise cartridges disposed in the hydraulic chamber between the piston and the gas chamber. These shock-absorbing cartridges are passed through by the hydraulic fluid alternately in each direction during the displacement of the piston in the hydraulic chamber and are for this purpose provided with valves which may be conventionally constituted by a closure member elastically biased against its seat by a spring.

These valves operate correctly until a sudden maximum speed of the vehicle is reached. But above this speed and more particularly on a more or less uneven ground, very rapid peaks and drops in the hydraulic pressure occur in respect of which the response time of the valve is insufficient. Consequently the latter may open and close out of time with respect to the pressure peaks and drops when the vehicle passes over bumps or hollows, which might result in the complete breakage of the suspension of the vehicle owing to the brutal forces to which the suspension is subjected.

An object of the invention is therefore to overcome this serious drawback by providing a peak-clipping valve whose design enables the suspension element in which it is integrated to absorb without damage bumps and hollows on uneven ground at a speed higher than the present maximum speed of the heavy vehicles.

The rapidly opening, double acting peak-clipping valve of the invention comprises a hollow body provided with a first inlet or outlet opening and a second outlet or inlet opening for a hydraulic fluid and, disposed within said body, the following elements:

(a) a hollow slide slidably mounted inside a sleeve which is slidably mounted in the body and coaxial with the slide along the general axis of the valve;

(b) an elastic element bearing against the body and biasing the slide into abutment relation to an annular end of the sleeve and also said sleeve in abutment relation against a corresponding annular seat of the body;

(c) and the annular bearing section of the slide on the sleeve is less than the annular bearing section of the sleeve on its seat, the sleeve being provided with bores communicating with the first inlet opening, and said bores remain closed by the slide so long as the valve is at rest and open onto the interior of the sleeve and of the slide and toward the second opening of the body when the slide is moved away from the sleeve under the effect of a hydraulic pressure in the first opening which is very much higher than the hydraulic pressure prevailing in the second opening of the body and inside the slide and the sleeve, while, inversely, a pressure in the second opening and inside the slide and the sleeve very much higher than the pressure in the first opening causes the sleeve to move away from its seat of bearing against the body by driving the slide against the force of the elastic element, which puts the interior of the sleeve and of the slide in communication with the first opening.

According to a feature of the invention, the annular sections or bearing surfaces of the slide against the sleeve and of the sleeve against its seat are frustoconical or spherical, and these frustoconical or spherical sections bear against corresponding edges of the seats, the diameter of the annular bearing section of the sleeve being larger than that of the annular section of the slide.

According to another feature of the invention, the body has a first end wall provided with a series of peripheral apertures constituting the first opening and which open onto an annular chamber surrounding the sleeve and the slide, a second end wall of the body opposed to the first end wall being provided with a central passageway forming said second opening, and the sleeve is provided with a frustoconical or spherical end portion maintained in bearing relation to a seat integral with said first end wall of the body when the valve is at rest and then closing all communication between the annular chamber and the interior of the sleeve and slide.

Further features and advantages of the invention will be apparent from the following description, with reference to the accompanying drawings which illustrate several embodiments of the invention by way of non-limiting examples:

FIG. 1 shows the principle of operation of a first embodiment of the rapidly opening double acting peak-clipping valve according to the invention for equipping a hydropneumatic suspension element of a heavy vehicle.

Figure 5:
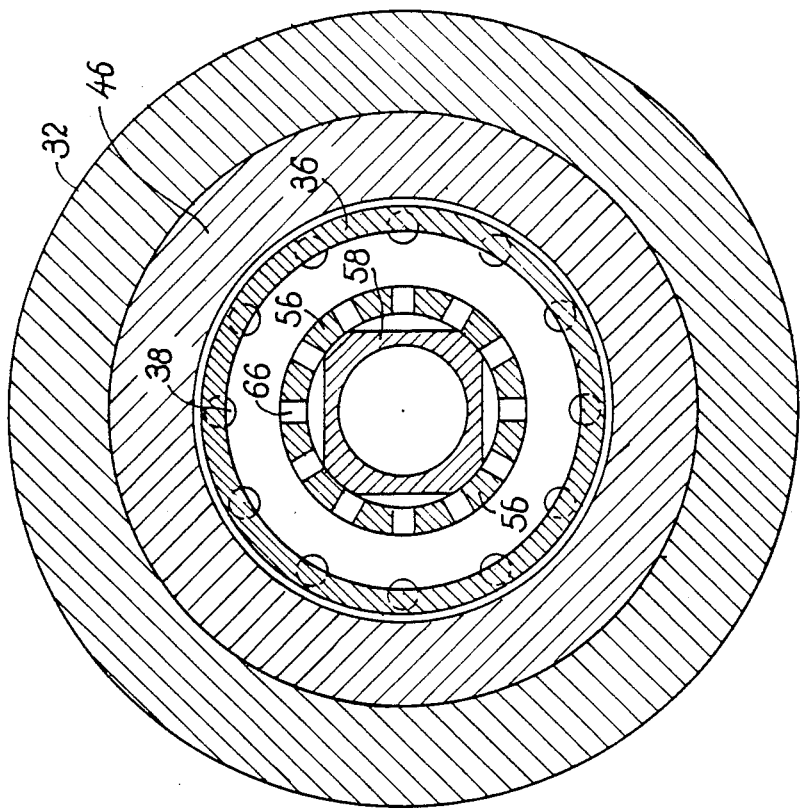
FIG. 5 is a cross-sectional view taken on line V—V of FIG. 3.

The valve 1 comprises a hollow body 2 provided with a first inlet or outlet opening 3 and a second outlet or inlet opening 4 for a hydraulic fluid (oil) and, disposed within the body 1 the following elements:

(a) a hollow slide 5 slidably mounted within a hollow sleeve 6 which is slidably mounted in the body 1 and coaxial with the slide 5 on the general axis of the valve;

(b) an elastic element 7, here constituted by a coil spring, which bears against the end wall of the body 1 and biases the slide 5 into abutment against an annular seat 8 of the sleeve 6 and also the latter into abutment against a corresponding annular seat 9 of the body 1.

The annular surface or section 11 of the bearing of the slide 5 against the sleeve 6 is frustoconical or spherical and, likewise, the annular section 12 of the bearing of the sleeve 6 against its seat 9 is frustoconical or spherical, these frustoconical or spherical surfaces 11, 12 bearing against respective seats 8, 9. The outside diameter d4 of the bearing section 11, i.e. its largest diameter, is less than the diameter d3 of the annular section 12 in the region of the bearing edge of the latter on the seat 9, this diameter d3 being also that of a projecting end portion 13 of the sleeve 6. The latter is provided with radial ports 14 which communicate with the first opening 3, and radial apertures 15 which put the interior of the sleeve 6 in communication with an annular chamber 16 provided between the sleeve 6 and the body 2 and limited at one end by the bearing section 12 and at the other end by the end portion 13. The opening 3 also opens, through radial ports 17 in the sleeve 6, onto an annular chamber 18 defined on one side by an annular shoulder 19 of the sleeve 6 in which the slide 5 is slidable and on the opposite side by the frustoconical section 11. Thus, the outside diameter d2 of the chamber 18 is larger than the diameter d1 of the shoulder 19 and the slide 5 in this region.

Figure 1:
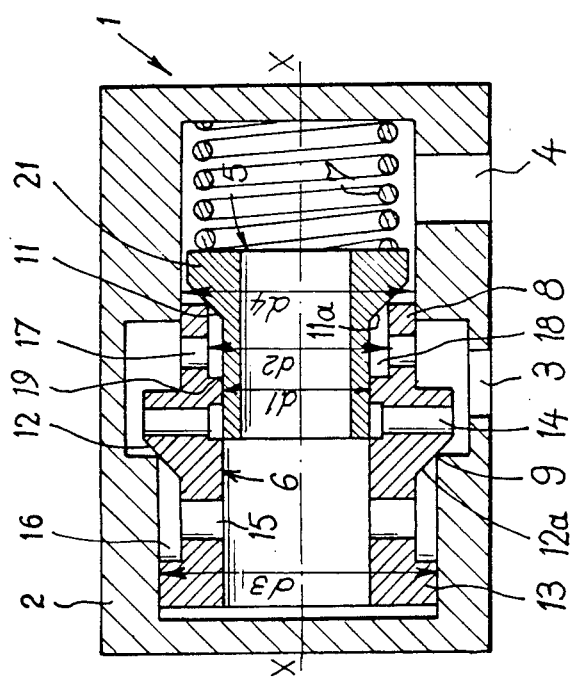
FIG. 1 is an axial sectional view of a peak-clipping valve according to a first embodiment of the invention, this valve being at rest.

The component elements of the valve 1 are so dimensioned that slight escapes of hydraulic fluid due to the operating clearances enable the fluid to pass from the ports 14 to the interior of the sleeve 6 and from the slide 5 and the opening 3 to the exterior part of the bearing section 11 when the valve is at rest, as illustrated in FIG. 1, the ports 14 being then closed by the slide 5. On the other hand, a large clearance exists between the body 2 and the end 21 of the slide 5 of diameter d4.

The valve 1 just described operates in the following manner:

at rest, the spring 7 maintains the frustoconical section 11 of the slide 5 against the edge of the seat 8 and the frustoconical or spherical section 12 against the edge of the seat 9, and the slide 5 closes the ports 14. The passage between the openings 3 and 4 is then limited to the clearance between the slide 5 and the sleeve 6 at the place of the diameter d1 and of the clearance between the sleeve 6 and the body 2 at the diameter d4;

if the pressure in the opening 3 and the annular chamber 16 is higher than the pressure inside the slide 5 and the opening 4 and if this pressure difference applied to the annular section 11a between the diameters d2 and d1, becomes larger than the opposing force exerted by the spring 7, the slide 5 is biased toward the right as viewed in FIG. 1 and moves away from the sleeve 6. Consequently, the ports 14 are put into communication with the interior of the sleeve 6 and the slide 5, which permits the passage of the fluid from the opening 3 to the opening 4 through a large section, even for a small movement of the slide 5 away from the sleeve 6.

Further, at the moment of the opening of the slide 5, the hydraulic pressure which is initially applied to the partial section 11a is exerted on the whole of the frustoconical section 11 and causes an increase in the opening of the slide 5;

if, inversely, the pressure in the opening 4 and the interior of the slide 5 and of the sleeve 6 becomes larger than the pressure in the opening 3, this pressure difference is applied to the annular section 12a between the edge of the seat 9 and the diameter d4. When this pressure difference produces on the sleeve 6 and the slide 5 an axial force greater than the opposing force given by the force applied for pressing the spring 7 in position, the sleeve 6 is urged back away from its seat 9, which provides a passage for the fluid between the seat 9 and the bearing section 12. The fluid can then flow through the opening 3;

the principle of the valve illustrated in FIG. 1 is applicable to any hydraulic system which does not require an absolute fluidtightness between two points but requires on the other hand a rapid clipping of the pressure peaks in one direction or the other, for example a shock-absorber of an oleo-pneumatic suspension element with a limitation of the shock-absorbing force in compression and in extension.

Figure 2:
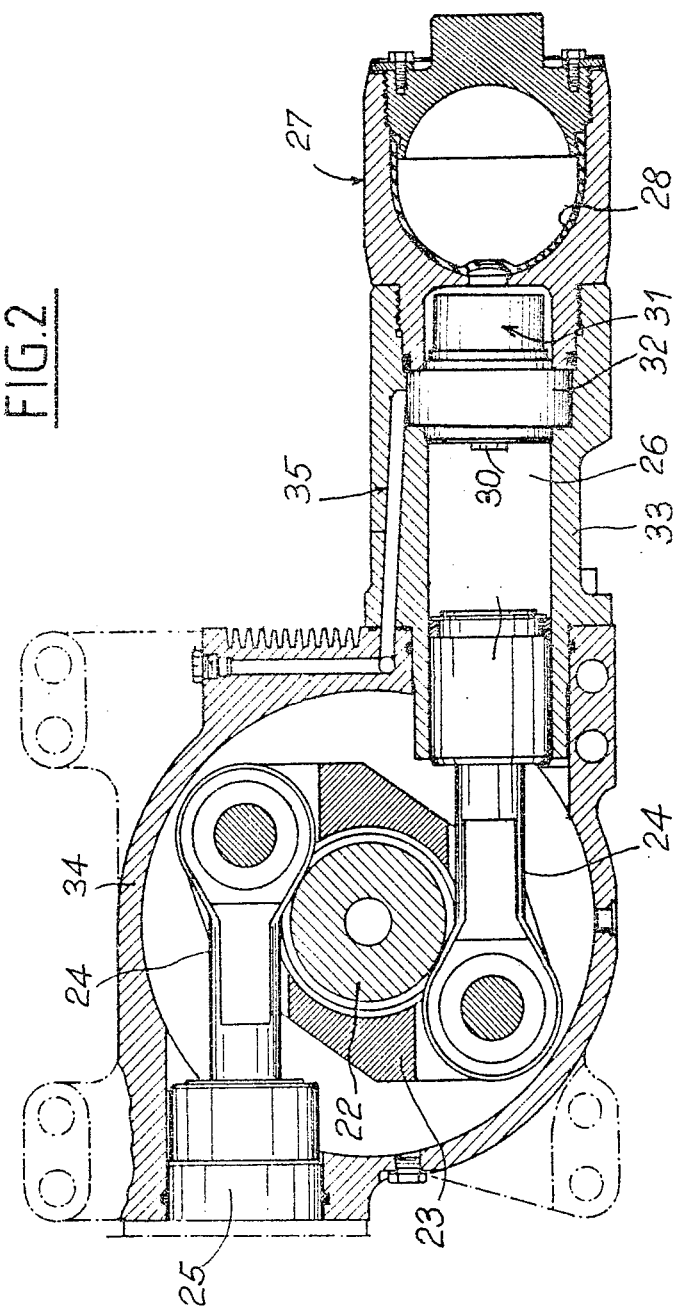
FIG. 2 is an axial sectional view of a suspension element of a heavy vehicle provided with a rapidly opening peak-clipping valve according to the invention.

The suspension element represented in FIG. 2 is described in detail in French Patent Application No. 83 20063 in the name of the Applicant. This element comprises a wheel supporting arm 22 (only a cross-sectional view of this arm is here shown and the end of this arm opposed to the visible part in the drawing is articulated to a vertically movable roller). Articulated to a balancing element 23 integral with the arm 22 are the ends of the rods 24 of two pistons which are simultaneously movable in opposite directions when the arm 22 pivots, inside hydraulic chambers 26. Associated with each chamber 26 is a gas accumulator 27 having a flexible diaphram 28 and a shock-absorbing cartridge 29 provided with a peak-clipping valve 31 according to the invention, the last two component elements being interposed between the end of the accumulator 27 and the end of the chamber 26. An element 32 is also interposed between the ends of the accumulator 27 and the cylinder 33 defining the chamber 26. Arranged in the element 32 and in the wall of the cylinder 33 and in the housing 34 enclosing the rods 24 is a heat tube 35 described in the aforementioned French Patent Application and which is not part of the present invention.

Figure 4:
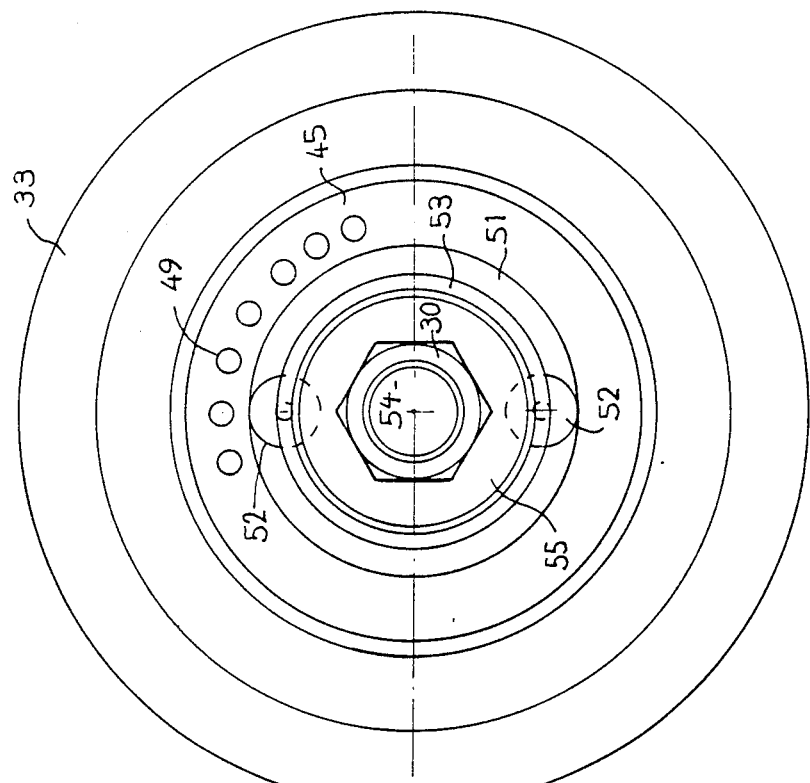
FIG. 4 is a transverse elevational view in the direction of arrow F of FIG. 3.
Figure 3:
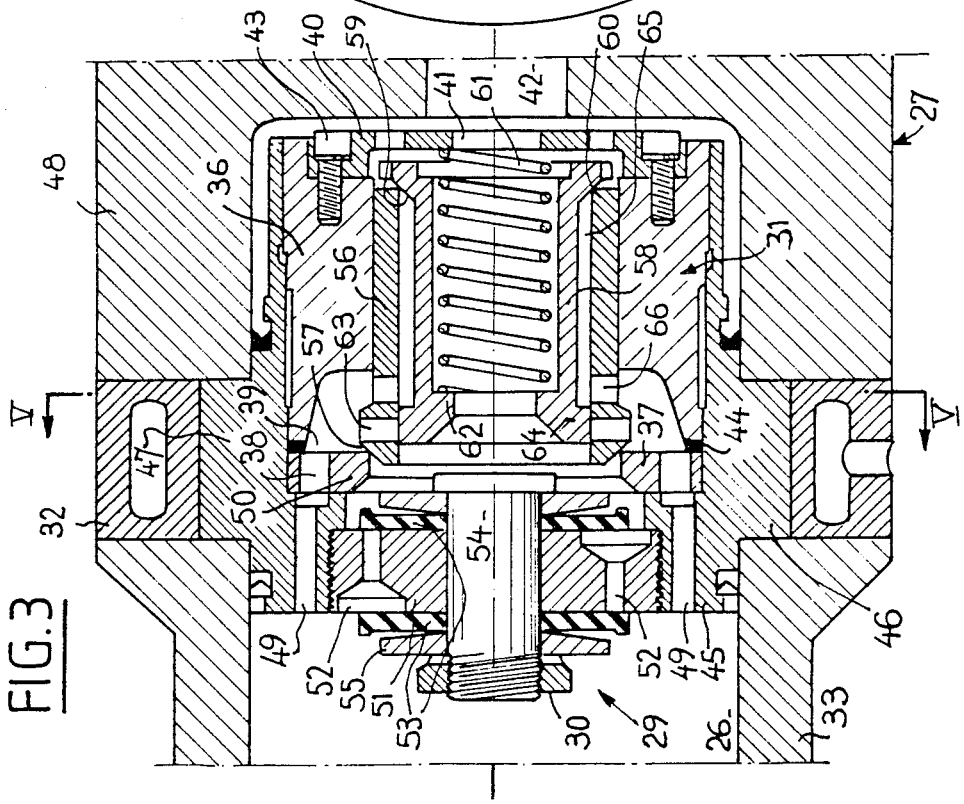
FIG. 3 is an axial sectional view to an enlarged scale of the peak-clipping valve with which the element shown in FIG. 2 is provided, this valve being at rest.

In an industrial embodiment of the valve illustrated in FIGS. 3 to 5, this valve 31 comprises a body 36 to which is attached a first annular end wall 37 provided with a series of peripheral apertures 38 corresponding to the first opening 3 of FIG. 1. A second annular end wall 40 opposed to the end wall 37, provided with a central passage 41 coaxial with an axial conduit 42 leading to the flexible diaphragm 28, is attached to the body 36 by screws 43. A sealing element 44 is interposed between the end wall 37 and the body 36, the end wall 37 being moreover maintained applied against the sealing element 44 by a ring 45 of a housing 46 containing the whole of the valve 31. The housing 46 is provided with an annular shoulder 47 engaged between the wall of the cylinder 33 and the wall 48 of the gas accumulator 27 for retaining the valve 31.

The ring 45 is provided on its periphery with a series of axial apertures 49 which open onto the apertures 38. Further, the ring 45 is tapped for receiving a disc 51 provided with two funnel-shaped ports 52 which are axially inverted. Two flexible washers 53 are disposed in front of the ports 52 and maintained in position by an axial screw 54 extending through the disc 51 and the washers 53, annular elements 55 located at the ends of the screw 54 retaining the elastic washers 53.

The shock-absorber device constituted by the disc 51, the washers 53 and their elements fixing them to the disc 51, permits the alternating flow of oil on each side of the disc 51 through the ports 52 as a function of the pressure: indeed, the upper part in FIG. 3 of the washer 53 located adjacent to the hydraulic chamber 26 does not close the port 52 which is on the other hand closed by the upper part of the washer 53 located on the other side of the disc 51, this assembly being reversed in the lower half of FIG. 3. Thus, when the hydraulic pressure in the chamber 26 increases, the oil travels through the upper port 52 and urges back the washer 53 located adjacent to the valve 51, while the lower part of the washer 53 located adjacent to the chamber 26 closes the corresponding port 52. This procedure is reversed when the hydraulic pressure in the valve 31 becomes higher than the hydraulic pressure in the chamber 26.

The valve 31 has a sleeve 56 which is generally cylindrical and axially slidably mounted inside the body 36. The sleeve 56 is provided with a frustoconical (or spherical) end portion 57 maintained in bearing relation to the edge of a seat 50 of the end wall 37 so that any communication is closed between an annular chamber 39 of the body 36 and the interior of the sleeve 56.

The sleeve 56 contains a coaxial slide 58 whose end opposed to the end wall 37 has a frustoconical (or spherical) section 59 maintained in bearing relation against an edge of the corresponding end of the sleeve 56 by a coil spring 61 which bears against the end wall 39 in coaxial relation to the passage 41. The opposite end of the spring 61 biases the slide 58 by a projecting interior edge portion 62 of the latter.

Radial ports 63 are provided in the sleeve 56 in the vicinity of its frustoconical portion 57 and communicate on one side with the annular chamber 39 while on the other side the ports 63 are closed by an annular end portion 64 of the slide 58 when the valve 31 is at rest (FIG. 3). The frustoconical section 59, outwardly projecting at the end of the slide 58 opposed to its end 64, defines with this end and the sleeve 56 an annular space 65 which communicates with the chamber 31 through radial ports 66 in the sleeve 56.

The diameter of the edge 60 of the sleeve 56 and of the zone of the bore of the sleeve defining the annular space 65 and close to this edge 60, is slightly larger than the diameter of the sliding in the sleeve 56 of the projecting end portion 64 of the slide 58. These two diameters respectively correspond to the diameters d2 and d1 of FIG. 1.

The inside diameter of the sleeve 50 is slightly larger than the sliding diameter of the sleeve 56 in the body 6. These two diameters respectively correspond to the diameters d3 and d4 of FIG. 1.

The rapidly opening peak-clipping valve 31 operates in the following manner:

At rest (FIG. 3), the sleeve 56 bears by its conical end section 57 agains the seat 50, the slide 58 bears against the end of the sleeve 56 by its frustoconical section 59 and the projecting end portion 64 of the slide 58 closes the radial ports 63. As long as the hydraulic pressure in the chamber 26 does not vary too rapidly, the oil flows on each side of the disc 51 through the ports 52 in both directions with no intervention on the part of the peak-clipping valve 31.

If now a sudden increase occurs in the pressure in the hydraulic chamber 26, for example owing to a passage of the vehicle over a bump at high speed, the pressure in the ports 49, 38 and in the chamber 39 rapidly becomes very much greater than the hydraulic pressure in the opening 49 and inside the slide 58. This pressure differential is applied to the frustoconical section 59 of the slide 58 between the edge 60 and the aforementioned diameter of the end portion 64 of the slide 58, and causes the slide 58 to move away from its seat 60. This separation of the slide 58 from the sleeve 50 then uncovers the ports 63 so that the fluid flows through the latter to the interior of the slide 58 and the outlet 41. Correspondingly, as soon as the slide 58 is slightly separated from the sleeve 56, the hydraulic pressure is exerted on the whole of the frustoconical surface 59 and maintains the slide 58 spaced away from the sleeve 56 in opposition to the return force exerted by the spring 61. Consequently, the fluid can flow from the chamber 39 to the interior of the slide 58 and thence to the outlet 41. The valve 31 returns to a position of rest when the pressure peak ceases.

Inversely, if a sudden depression occurs in the hydraulic chamber 26, for example if the vehicle travels at high speed over a hole, the hydraulic pressure in the opening 41 and inside the slide 58 suddenly becomes very much greater than the pressure in the chamber 39 and the ports 38.

When, owing to the passage of the vehicle for example at high speed in a hole, a sudden depression occurs in the hydraulic chamber 26, the hydraulic pressure applied to the part of the frustoconical section 57 which is interior relative to the bearing edge of the seat 58, i.e. the part of this section 57 exterior to the chamber 39, becomes distinctly greater than the pressure prevailing in the chamber 39. Owing to the slight difference between the diameters of the seat 50 and the opposed end of the sleeve 56, the resulting pressure differential exerts on the sleeve 56 a force which shifts it away from its seat 50. Consequently, the fluid thus freely flows from the passage 42 to the chamber 26 by passing through the annular chamber 39. Likewise, the slide 58 is moved by its frustoconical section 59 away from the edge of its seat on the end portion of the sleeve 56 by the pressure in opposition to the reaction of the spring 61, so that the ports 63 are uncovered. The fluid at high pressure therefore flows then also through the ports 63 into the chamber 39, the ports 38 and the ports 49 to the hydraulic chamber 26.

When the pressure in the latter has returned to its normal level, the valve 31 returns to its position of rest.

The valve according to the invention therefore permits the clipping or elimination in both senses of the sudden peaks or drops in the hydraulic pressure owing to a very rapid opening, which avoids seriously damaging the suspension of a heavy vehicle travelling at high speed over uneven ground.

This valve is of utility in particular in the shock-absorber of French Pat. No. 85 08756 and in the suspension element of French Pat. No. 85 05067.

Figure 6:
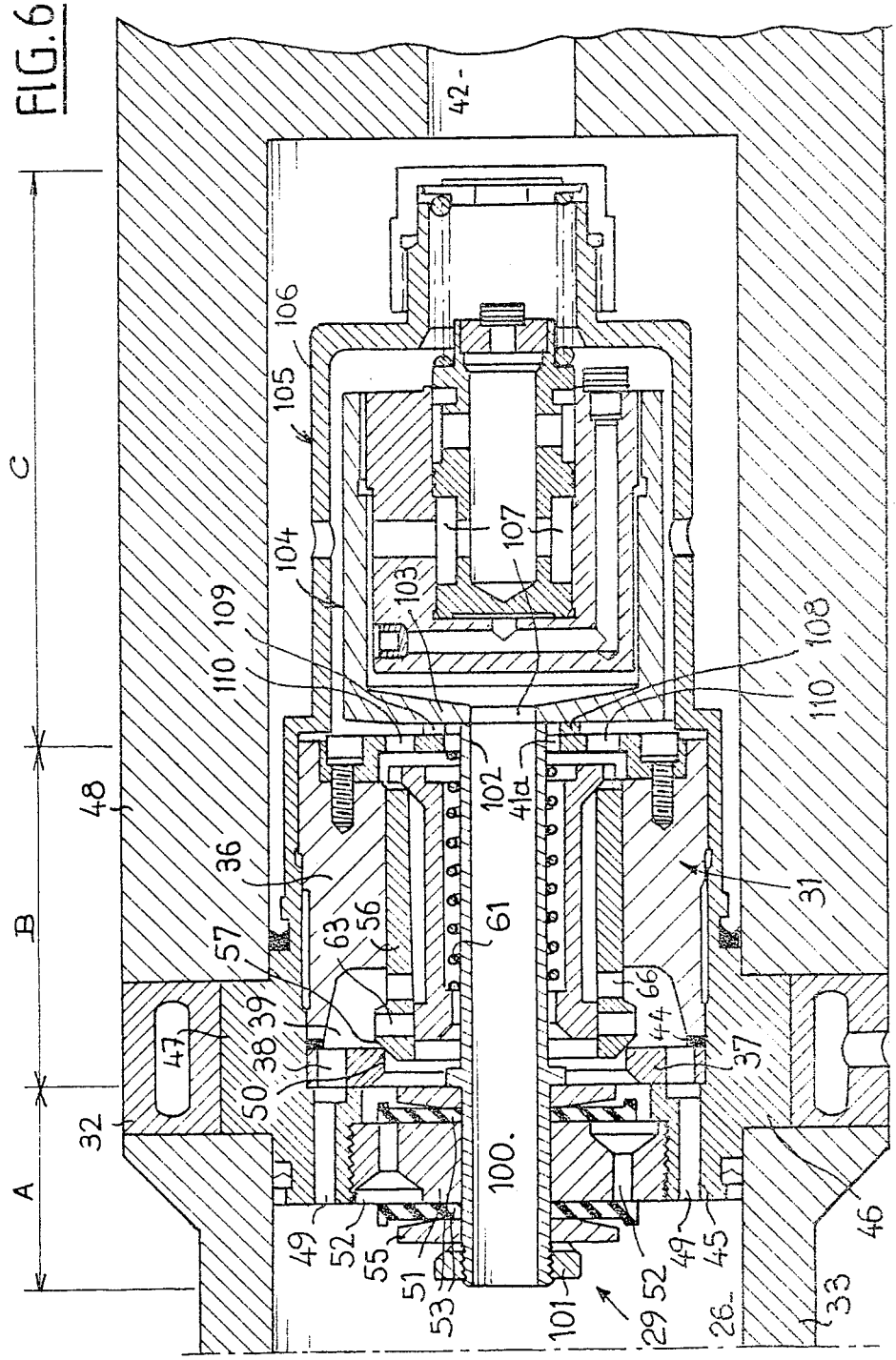
FIG. 6 is an axial sectional view of a shock-absorber of a suspension element in which a peak-clipping valve according to FIGS. 3 to 5 is integrated.

FIG. 6 illustrates the use of the double-acting peak-clipping valve 31 in a shock-absorber according to said French Pat. No. 85 08756 into which it is integrated, this combination being also covered by the invention.

The device shown in FIG. 6 comprises, disposed axially and in the mentioned order in the hydraulic chamber 26 toward the pneumatic accumulator 27: shock-absorbing means A having elastic washers 53 performing the same function as those of the valve 31 but in a modified state, a double-acting valve system B, constituted by the valve 31 which is slightly modified, and a shock-absorber filter C whose structure is similar to that of the shock-absorber having a sliding slide disclosed in the French Pat. No. 85 08756.

From a functional point of view, the device of FIG. 6 therefore corresponds to a combination of the valve 31 according to the invention and the shock-absorber of the aforementioned patent, which amounts to interposing the peak-clipping valve 31 between the shock-absorbing system employing washers and the filter system employing a sliding slide disclosed in this patent.

The shock-absorbing means A comprise a tubular member 100 which replaces the screw 54 and carries a nut 101 for fixing the elements 55 and 53, and this member 100 extends axially through the shock-absorbing device (51, 53, 52) and the slide 58. Its end portion 102 remote from the washers 53 opens into the central opening 107 of an end wall 103 of a tubular sleeve 104 coaxial with the slide 58 and located beyond the end wall 40 of the valve 31. The end portion 102 is fixed to the end wall 103 and the sleeve 104 is part of a shock-absorbing filter 105 similar to that disclosed in said French Pat.

No. 85 08756 and consequently need not be described again here.

This filter comprises a tubular body 106 containing the sleeve 104 and mounted on the housing 46 or made in one piece with the latter. The end wall 40 of the valve 31 and the end wall 103, are spaced apart by a gap in which extend axial extensions 108 of the end wall 103 separated by free passages 109 for the circulation of the oil.

As the end wall 40 is provided with peripheral apertures 110 and a central opening 41a, the oil can flow around the tube 100 on each side of the end wall 40 and between the latter and the end wall 103. The spring 61 surrounds the tube 100 and bears against the end wall 40.

What is claimed is:

1. A rapidly opening peak-clipping valve for a hydropneumatic suspension element of a heavy vehicle, said valve comprising a hollow body provided with a first inlet or outlet opening and a second outlet or inlet opening for a hydraulic fluid and, disposed in said body, the following elements:
   (a) a sleeve slidably mounted in the body and a hollow slide slidably mounted inside the sleeve in coaxial relation to the sleeve and the body;
   (b) the sleeve having an annular end portion, and the body having an annular seat, an elastic element having one end bearing against the body and an opposite end bearing against the slide and biasing the slide into abutment against the annular end portion of the sleeve and also biasing the sleeve into abutment against the corresponding annular seat of the body;
   (c) and the slide has an annular bearing section on the sleeve and the sleeve has an annular bearing section on said seat, the annular bearing section of the slide being less than the annular bearing section of the sleeve, radial ports provided in the sleeve and communicating with said first opening (3,38,39) and with an an annular chamber (18,65) defined between said slide and said sleeve and by said bearing section (11,59) of the slide on the sleeve, and said ports being positioned to be closed by the slide as long as the valve is in a state of rest and to communicate with the interior of the sleeve and the slide and said second opening of the body when the slide is moved away from the sleeve under the effect of a hydraulic pressure in said first opening which is very much higher than the hydraulic pressure prevailing in said second opening of the body and the interior of the slide and the sleeve, while, inversely, a pressure in said second opening and inside the slide and the sleeve which is very much higher than the pressure in said first opening causes the sleeve to move away from said seat, by which seat it bears against the body, in carrying the slide along therewith against the force exerted by the elastic element, which puts the interior of the sleeve and the slide in communication with the first opening;
   wherein the sleeve defines with the body an annular chamber surrounding the sleeve and the slide, the body has a first annular end wall provided with a series of peripheral apertures which constitute said first opening and open onto said annular chamber, the body has a second end wall opposed to the first end wall and provided with a central passage forming said second opening, and the sleeve has a tapering end portion which is positioned to be maintained in bearing relation to a seat carried by said first end wall of the body when the valve is in a state of rest to close any communication between said annular chamber and the interior of the sleeve and the slide.

2. A valve according to claim 1, wherein said annular bearing section of the slide and said annular bearing section of the sleeve are tapering, the annular bearing section of the sleeve having a diameter larger than the diameter of the annular bearing section of the slide.

3. A valve according to claim 2, wherein said tapering annular bearing sections are frustoconical.

4. A valve according to claim 2, wherein said tapering annular bearing sections are spherical.

5. A valve according to claim 1, wherein said tapering end portion is frustoconical.

6. A valve according to claim 1, wherein said tapering end portion is spherical.

7. A rapidly opening peak-clipping valve for a hydropneumatic suspension element of a heavy vehicle, said valve comprising a hollow body provided with a first inlet or outlet opening and a second outlet or inlet opening for a hydraulic fluid and, disposed in said body, the following elements:
   (a) a sleeve slidably mounted in the body and a hollow slide slidably mounted inside the sleeve in coaxial relation to the sleeve and the body;
   (b) the sleeve having an annular end portion, and the body having an annular seat, an elastic element having one end bearing against the body and an opposite end bearing against the slide and biasing the slide into abutment against the annular end portion of the sleeve and also biasing the sleeve into abutment against the corresponding annular seat of the body;
   (c) and the slide has an annular bearing section on the sleeve and the sleeve has an annular bearing section on said seat, the annular bearing section of the slide being less than the annular bearing section of the sleeve, radial ports provided in the sleeve and communicating with said first opening and said ports being positioned to be closed by the slide as long as the valve is in a state of rest and to communicate with the interior of the sleeve and the slide and said second opening of the body when the slide is moved away from the sleeve under the effect of a hydraulic pressure in said first opening which is very much higher than the hydraulic pressure prevailing in said second opening of the body and the interior of the slide and the sleeve, while, inversely, a pressure in said second opening and inside the slide and the sleeve which is very much higher than the pressure in said first opening causes the sleeve to move away from said seat, by which seat it bears against the body, in carrying the slide along therewith against the force exerted by the elastic element, which puts the interior of the sleeve and the slide in communication with the first opening;
   wherein the sleeve defines with the body an annular chamber surrounding the sleeve and the slide, the body has a first annular end wall provided with a series of peripheral apertures which constitute said first opening and open onto said annular chamber, the body has a second end wall opposed to the first end wall and provided with a central passage forming said second opening, and the sleeve has a tapering end portion which is positioned to be maintained in bearing relation to a seat carried by said first end wall of the body when the valve is in a state of rest to close any communication between said annular chamber and the interior of the sleeve and the slide;

wherein a housing surrounds said hollow body and defines axial ports and the seat of the sleeve is constituted by an edge of said first end wall which end wall is formed by an annular element mounted on the body and provided adjacent to the periphery thereof with a series of apertures communicating on one side of said annular element with the axial ports of the housing and on the other side of said annular element with said annular chamber.

8. A rapidly opening peak-clipping valve for a hydropneumatic suspension element of a heavy vehicle, said valve comprising a hollow body provided with a first inlet or outlet opening and a second outlet or inlet opening for a hydraulic fluid and, disposed in said body, the following elements:

(a) a sleeve slidably mounted in the body and a hollow slide slidably mounted inside the sleeve in coaxial relation to the sleeve and the body;

(b) the sleeve having an annular end portion, and the body having an annular seat, an elastic element having one end bearing against the body and an opposite end bearing against the slide and biasing the slide into abutment against the annular end portion of the sleeve and also biasing the sleeve into abutment against the corresponding annular seat of the body;

(c) and the slide has an annular bearing section on the sleeve and the sleeve has an annular bearing section on said seat, the annular bearing section of the slide being less than the annular bearing section of the sleeve, radial ports provided in the sleeve and communicating with said first opening and said ports being positioned to be closed by the slide as long as the valve is in a state of rest and to communicate with the interior of the sleeve and the slide and said second opening of the body when the slide is moved away from the sleeve under the effect of a hydraulic pressure in said first opening which is very much higher than the hydraulic pressure prevailing in said second opening of the body and the interior of the slide and the sleeve, while, inversely, a pressure in said second opening and inside the slide and the sleeve which is very much higher than the pressure in said first opening causes the sleeve to move away from said seat, by which seat it bears against the body, in carrying the slide along therewith against the force exerted by the elastic element, which puts the interior of the sleeve and the slide in communication with the first opening;

wherein the sleeve defines with the body an annular chamber surrounding the sleeve and the slide, the body as a first annular end wall provided with a series of peripheral apertures which constitute said first opening and open onto said annular chamber, the body has a second end wall opposed to the first end wall and provided with a central passage forming said second opening, and the sleeve has a tapering end portion which is positioned to be maintained in bearing relation to a seat carried by said first end wall of the body when the valve is in a state of rest to close any communication between said annular chamber an the interior of the sleeve and the slide;

wherein radial ports are provided in the sleeve in the vicinity of the tapering end portion of the sleeve and communicate on one side of the sleeve with said annular chamber while on the opposite side of the sleeve said ports are closed by an annular end portion of the slide when the valve is in a state of rest, the annular bearing section of the slide bearing against the sleeve being provided at the end thereof opposed to the end portion which closes the ports of the sleeve and formed by an outwardly projecting tapering section of the slide so as to define an annular space between the slide and the sleeve, said tapering section being in bearing relation to the edge of a seat of the sleeve.

9. A valve according to claim 8, wherein said tapering end portion and said tapering section have a frustoconical shape.

10. A valve according to claim 8, wherein said tapering end portion and said tapering section have a spherical shape.

11. A valve according to claim 8, wherein apertures are provided radially in the sleeve in a vicinity of the radial ports to put the annular chamber and the annular space between the slide and the sleeve in communication with each other, said annular space being axially defined by the tapering section of the slide and by the outwardly projecting annular end portion of the slide which closes the radial ports of the sleeve when the valve is in a state of rest.

12. A valve according to claim 8, wherein the slide has an inwardly projecting annular shoulder at an end of the slide and the elastic element is constituted by a coil spring having one end bearing against the second end wall of the body around the central passage thereof and an opposite end which exerts a biasing force on said inwardly projecting annular shoulder of the slide.

13. A suspension device for a heavy vehicle comprising in combination: a shock-absorber including shock-absorbing means employing elastic washers, a rapidly opening peak-clipping valve, and a shock-absorbing filter integral with the valve and so arranged as to communicate with the interior of said valve, said valve comprising a hollow body provided with a first inlet or outlet opening and a second outlet or inlet opening for a hydraulic fluid and, disposed in said body, the following elements:

(a) a sleeve slidably mounted in the body and a hollow slide slidably mounted inside the sleeve in coaxial relation to the sleeve and the body;

(b) the sleeve having an annular end portion, and the body having an annular seat, an elastic element having one end bearing against the body and an opposite end bearing against the slide and biasing the slide into abutment against the annular end portion of the sleeve and also biasing the sleeve into abutment against the corresponding annular seat of the body;

(c) and the slide has an annular bearing section on the sleeve and the sleeve has an annular bearing section on said seat, the annular bearing section of the slide being less than the annular bearing section of the sleeve, radial ports provided in the sleeve and communicating with said first opening (3,38,39) and with an an annular chamber (18,65) defined between said slide and said sleeve and by said bearing section (11,59) of the slide on the sleeve, and said ports being positioned to be closed by the slide as long as the valve is in a state of rest and to communicate with the interior of the sleeve and the slide and said second opening of the body when the slide is moved away from the sleeve under the effect of a hydraulic pressure in said first opening which is very much higher than the hydraulic pressure prevailing in said second opening of the body and the interior of the slide and the sleeve, while, inversely, a pressure in said second opening and inside the slide and the sleeve which is very much higher than the pressure in said first opening causes the sleeve to move away from said seat, by which seat it bears against the body, in carrying the slide along therewith against the force exerted by the elastic element, which puts the interior of the sleeve and the slide in communication with the first opening; wherein the sleeve defines with the body an annular chamber surrounding the sleeve and the slide, the body has a first annular end wall provided with a series of peripheral apertures which constitute said first opening and open onto said annular chamber, the body has a second end wall opposed to the first end wall and provided with a central passage forming said second opening, and the sleeve has a tapering end portion which is positioned to be maintained in bearing relation to a seat carried by said first end wall of the body when the valve is in a state of rest to close any communication between said annular chamber and the interior of the sleeve and the slide.

14. A device according to claim 13, wherein a tubular member extends axially through the shock-absorbing means and the slide, the tubular member having an end portion which is remote from said elastic washers and which opens into a tubular sleeve of the filter, means being provided for permitting the passage of the hydraulic fluid from an axial gap between an end wall of the body of the valve and an end wall of the tubular member and the interior of the slide through a central opening of said end wall.

* * * * *